March 14, 1950   J. W. CODD   2,500,451
FISHING LURE
Filed July 23, 1947
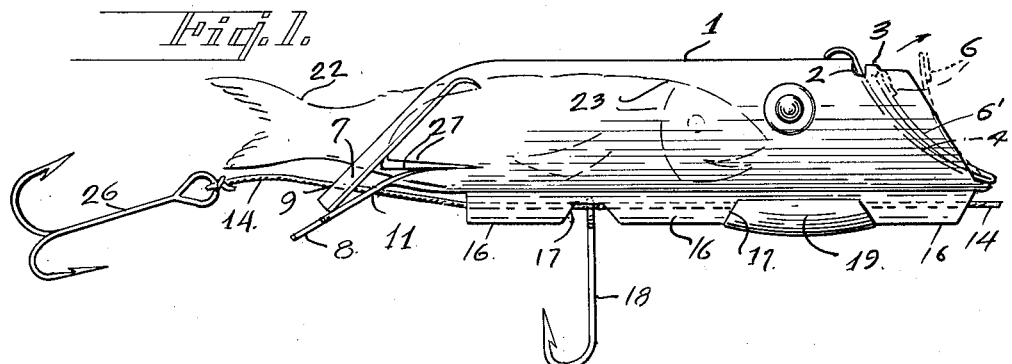
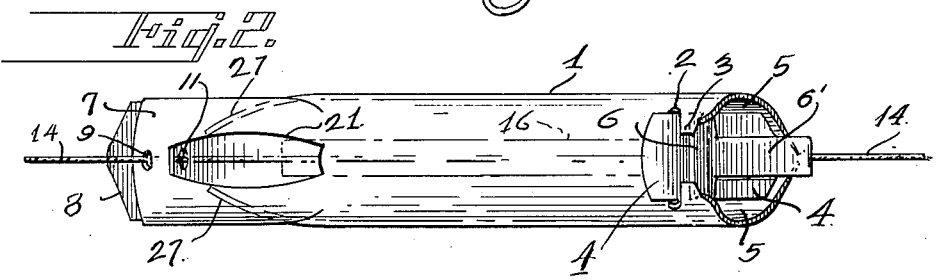
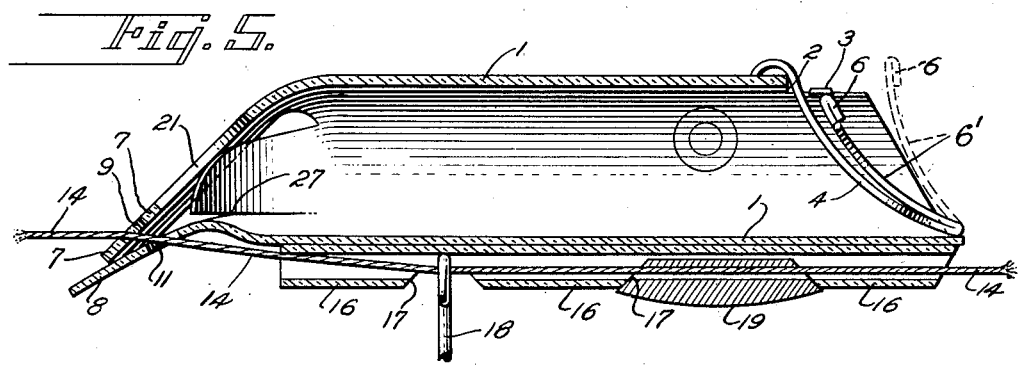
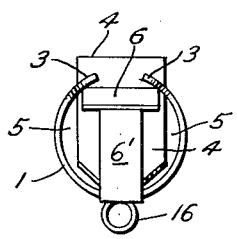
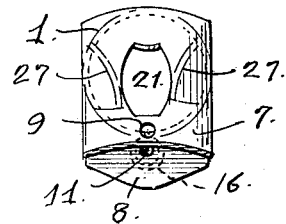
INVENTOR.
JOSEPH W. CODD
BY Arthur L. Slee
HIS ATTORNEY.

Patented Mar. 14, 1950

2,500,451

UNITED STATES PATENT OFFICE 2,500,451

FISHING LURE

Joseph W. Codd, San Francisco, Calif.

Application July 23, 1947, Serial No. 762,907

3 Claims. (Cl. 43—41)

The present invention relates to improvements in a fishing lure, preferably of the plug type, wherein a transparent tubular body arranged to convey and display live bait with a rear appendage thereof projecting beyond said body in proximate relation to a fishing hook trailing said body, operates in conjunction with closure means arranged to permit a constant passage of water through said body, whereby captive bait may be preserved in natural motion to lure fish.

The primary object of the present invention is to provide a new and improved fishing lure having improved means for displaying live gait to lure fish.

Another object is to provide a new and improved fishing lure of the character set forth having improved means for preserving live and active bait within its natural element and substantially unrestricted in natural motion.

A further object is to provide a new and improved fishing lure of the type described having improved means for naturally preserving unharmed live bait and displaying the same in proximate relation to fishing hooks or tackle to facilitate the capture of fish.

The invention consists in the deails of construction and the arrangement of the parts as disclosed in the drawings forming a part of the present application, and in which:

Fig. 1 is a side elevation of my improved fishing lure attached to a leader;

Fig. 2 is a plan view of the device with bait and certain tackle omitted;

Fig. 3 is a front end elevation of the lure with all tackle omitted;

Fig. 4 is a rear end elevation; with tackle omitted; and

Fig. 5 is a vertical, longitudinal section, taken through the line 14 and perpendicular to the paper, in Fig. 2.

Referring to the drawings:

The numeral 1 is used to designate a transparent tubular body preferably cut at an angle on an open front end and having a transverse interrupted slot 2 in the top thereof adjacent said front end forming lugs 3. A flexible closure or cover is formed from a preferably inclined flexible strip 4 inserted within the slot 2 and with its sides in spaced relation to the adjacent sides of the body 1 and partially obstructing said open front end but leaving openings 5 to permit and control a limited quantity of water passing into and through said tubular body 1, for a purpose hereinafter more fully set forth.

The flexible strip 4 has a reduced portion $6^2$ bent back upon itself at the lower end thereof and having a T shaped portion 6 on its upper end. The under sides of the lugs 3 detachably hold the flexible strip in place and prevent withdrawal of the same from the slot 2.

The rear end of the body 1 is substantially closed by means of upper and lower fins 7 and 8 having apertures 9 and 11, respectively, through which freely passes a leader 14 which previously passes through a reduced tube 16 on the under side of the body 1 and having apertures 17 through which may be passed or inserted auxiliary fishing tackle, such an added hook 18 and suitable sinker 19, bored longitudinally and loosely threaded upon the leader 14 strung through said tubular part 16.

The upper fin 7 is also provided with a preferably vertically disposed opening 21 through which may be projected the rear appendage or tail 22 of a live captive bait or minnow 23 confined in the body 1.

This tail or appendage 22 is free to move as with a swimming motion to attract or lure fish. The rear end of the leader, freely strung through the reduced tube 16, is provided with a hook 26 which, when tension is applied to said leader 14, as when fishing, is drawn into direct contact with the fin 7 and thereby held directly in proximate relation or adjacent the projected appendage or tail 22 of the bait 23.

Between the bases of the fins 7 and 8 and on opposite sides of the body 1, portions of said body 1 are formed into vertically disposed fins 27, one of which is slightly larger than the other, as disclosed in Fig. 1 of the drawings, whereby outlets of different sizes are formed at the rear end of said body 1 through which an unequal flow or exit of water from said body will tend to wiggle and accentuate the simulation of a minnow swimming, especially when a minnow has no disposition to wiggle actively.

In operation:

The T 6 of the reduced portion $6^1$, being flexible, is sprung forwardly from under the retaining lugs 3, as disclosed in dotted lines in Figs. 1 and 5 of the drawings, until said T 6 is released from the under sides of the lugs 3 when the flexible strip 4 may be moved upwardly in its slot 2 and removed to open the front end of the body 1. Live bait 23 is then inserted and the tail 22 thereof is projected through the opening 21 in the fin 7 and the flexible strip 4 is replaced, the flexible nature of said cover exerting sufficient pressure against the inner side of the body 1 to normally prevent removal of said strip. In addition, the pressure of water against said strip 4 will aid in keeping the front end of said tubular body 1 substantially closed, except for the spaces or openings 5, through which spaces 5 a sufficient quantity of water passes, when the lure is in the water, to constantly replenish the captive bait with oxygen and provide said bait with natural element.

Tension of the leader 14 obviously will move the rear fishhook 26 into contact with the rear fin 7 and in proximate relation to the projected bait 22, so that a fish striking at said bait may find itself seriously involved with said hook 26 instead of said bait.

As the leader 14 is freely strung through the smaller tube 16 and sinker 19 inserted or seated within an aperture 17 thereof it is obvious that no strain is placed upon the body 1 and the captive bait 23 therein is protected at all times from injury by a striking fish, and also assured of a constant supply of its natural element flowing through the lure which will naturally stimulate and spur said bait into an animation which will provide an added attraction to the lure to attract fish.

Having described my invention, I claim:

1. A fishing lure comprising a transparent tubular body having a partially closed front end and fins formed upon the upper end lower portions of the rear end thereof and having their ends meeting to partially close said rear end and to form a tail, said upper fin having an opening therethrough to permit the projection of a rear appendage of live bait within said transparent body.

2. A fishing lure comprising a transparent tubular body having a partially closed front end and rearwardly extended fins formed upon the upper and lower rear portions thereof and having their ends meeting to form a tail, said upper fin having an opening to permit the projection therethrough of a portion of a live bait within said transparent body; and a detachable closure mounted upon the front end of said body and only partially obstructing said front end to permit the passage of water into said body.

3. A fishing lure comprising a transparent tubular body having a partially closed front end and rearwardly extended fins formed upon the upper and lower rear portions thereof and having their ends meeting to form a tail, said upper fin having an opening adapted to permit the projection therethrough of a rear appendage of a live bait within said body; a detachable closure mounted within the front end of said body and only partly obstructing said front end and leaving openings between said closure and sides of said body to permit the passage of water into said body; a reduced tubular body mounted upon the under surface of said tubular body; and a leader freely threaded through said reduced tubular body.

JOSEPH W. CODD.

REFERENCES CITED

The following references are of record in the file of this patent:

UNITED STATES PATENTS

| Number | Name | Date |
|---|---|---|
| 422,226 | Kestner | Feb. 25, 1890 |

FOREIGN PATENTS

| Number | Country | Date |
|---|---|---|
| 186,857 | Great Britain | Oct. 12, 1922 |